United States Patent [19]
Suzuki

[11] Patent Number: 4,789,374
[45] Date of Patent: Dec. 6, 1988

[54] TORSIONAL VIBRATION ABSORBER

[75] Inventor: Hiroshi Suzuki, Anjo, Japan

[73] Assignee: Aisin Seiki Kabushiki Kaisha, Kariya, Japan

[21] Appl. No.: 108,090

[22] Filed: Oct. 14, 1987

[30] Foreign Application Priority Data

Oct. 15, 1986 [JP] Japan ............................ 61-157759[U]

[51] Int. Cl.⁴ .......................... F16D 3/12; F16D 13/64
[52] U.S. Cl. .................................... 464/64; 192/106.2; 464/68; 464/85
[58] Field of Search .......................... 192/106.1, 106.2; 464/66, 64, 68, 85

[56] References Cited

U.S. PATENT DOCUMENTS 3,809,198  5/1974  Mori .................................. 464/85 X
4,537,298  8/1985  Loizeau ............................. 464/68 X

FOREIGN PATENT DOCUMENTS 2371609  7/1978  France ............................. 192/106.2
55-20930  2/1980  Japan .............................. 192/106.2
57-204319 12/1982  Japan .............................. 192/106.1
59-200816 11/1984  Japan .

Primary Examiner—Daniel P. Stodola
Attorney, Agent, or Firm—Burns, Doane, Swecker & Mathis

[57] ABSTRACT

A torsional vibration absorber utilizes a resilient element comprising a coil spring positioned along relative rotational directions between drive and driven plates. The coil spring includes a compressive elastic member loosely positioned within the inner cavity of the coil spring and extending along the axis of the coil spring. Resin sheet elements having a diameter larger than the external diameter of the elastic member are provided as being fixed by bonding to each end of the elastic member. A metallic seat member is positioned at one end of the coil spring so as to provide contact with a corresponding resin member so as to compress the elastic member only in one of the relative rotational directions of the vibration absorber.

9 Claims, 4 Drawing Sheets

TORSIONAL VIBRATION ABSORBER

BACKGROUND

The present invention relates to a torsional vibration absorber, and more specifically to a vibration absorber incorporated in a flywheel, clutch disk, or drive shaft system, in particular, in order to absorb torque fluctuation of a combustion engine.

A prior-art absorber of this type comprises a drive plate connected to a drive source, a driven plate connected to a driven member, and resilient means disposed between these two plates, and these two plates are rotated relative to each other by resiliently compressing the resilient means. Particularly, it is well known that the above prior-art absorber is applied to a clutch disk for an automotive vehicle.

The relationship between transmission torque and torsional angle in a power transmission system subjected to influence of the elasticity of various components of an automotive vehicle drive system is roughly linear and has an natural vibration frequency and therefore resonated in a predetermined rotational speed range, thus resulting in undesirable vibrations and noise.

To overcome these problems, conventionally, countermeasures against vibrations and noise have been effected by additionally incorporating a frictional damper invention or by appropriately combining various resilient members of different rigidities to control the torsional torque characteristics in relation to the relative angular displacement between the drive plate and the driven plate according to the degree of the relative angular displacement. For instance, there exists a torsional vibration absorber such that the resilient member is composed of a coil spring and a cushion rubber elastic member disposed in an inner cavity of the coil spring, and a sheet is provided between both ends of the coil spring and both the plates (refer to Japanese Patent Kokai Publication No. 59-200816).

SUMMARY OF THE DISCLOSURE

Analysis of the Prior Art

In the above-mentioned prior-art absorber, however, there exists a problem in that the outer circumference of the cushion rubber elastic member is brought into sliding contact with the inner circumference of the coil spring, and therefore the cushion rubber elastic member is scraped away, so that the torsional characteristics vary. Further, in the practical torsional characteristics, although torque is applied to the cushion rubber elastic member up to a torsion range where the cushion rubber elastic member becomes operative on the engine acceleration side (positive side), torque is applied thereto only within a torsion range where only the coil spring is operative on the engine deceleration side (negative side). Therefore, in spite of the fact that a seat on the negative side serves only to prevent the cushion rubber elastic member from being urged toward the drive plate, it is necessary to form windows for the drive plate under consideration of the circumferential space where this seat is mounted, thus offering another problem in that the strength of the plate is reduced.

SUMMARY OF THE INVENTION

It is an object of the present invention to solve the above-mentioned problems.

The technical means for attaining the above-mentioned object resides in that: resilient means disposed between the drive plate and the driven plate is composed of a coil spring disposed along a relative rotational direction and a compressive rubber elastic member loosely disposed within an inner cavity of the coil spring; a resin sheet having a diameter larger than an external diameter of the compressive cushion rubber elastic member is fixed by strong bonding to both ends of the compressive rubber elastic member and disposed within said inner cavity of the coil spring; and a metallic seat is disposed at one end of the coil spring so as to be brought into contact with one of said resin sheets to compress the compressive rubber elastic member only in one of the relative rotational directions along which the both plates rotate.

On the basis of the above construction, when twisted in the positive direction, the coil spring is first compressed between the drive plate and the driven plate; secondly, the metallic seat pushed by the drive plate is brought into contact with the resin sheet to compress the compressive (cushion) rubber elastic member against the driven plate, so that a high torque is transmitted. When twisted in the negative direction, since the torque is low, the coil spring is compressed only between the drive plate and the driven plate, and the cushion rubber elastic member is not compressed. Since the compressive (cushion) rubber elastic member is provided with resin sheets fixed on both the ends thereof, the rubber elastic member will not be forced to penetrate the space between drive plates (i.e., main-and subplates). Further, even if a centrifugal force is generated by the rotation of the disk, since the outer circumference of the resin sheet is in contact with the inner circumference of the coil spring, the cushion rubber elastic member is prevented from contact with the coil spring, and any damage which might otherwise result from such contact.

As described above, since the diameter of the resin sheet is determined to be larger than that of the compressed cushion rubber elastic member, it is possible to prevent the contact and the resultant abrasion between the coil spring and the cushion rubber elastic member. Further, since the metallic seat (retainer for the spring) is so provided as to compress the cushion rubber elastic member only in the positive (forward) rotational direction, an engagement margin is narrow and further the resin sheet will not be forced to penetrate the space between the main-and the subplates. Further, since no metallic seat is provided on the reverse rotational side, the circumferential space can be reduced, and therefore the plate strength will not be reduced. It is selfexplanatory that one of the metallic seats (conventionally two) for one window is eliminated. The elastic member can be arranged so as to serve as at a second (or further) range (stage) of the torsion characteristics curve. The resin sheets are light in weight and small in size so that the conventional window space is fully utilized without enlargement.

Further preferred embodiments are set forth in the dependent claims.

In the following a preferred embodiment will be described based on the accompanying drawings.

DESCRIPTION OF THE PREFERRED EMBODIMENT

Figure 1:
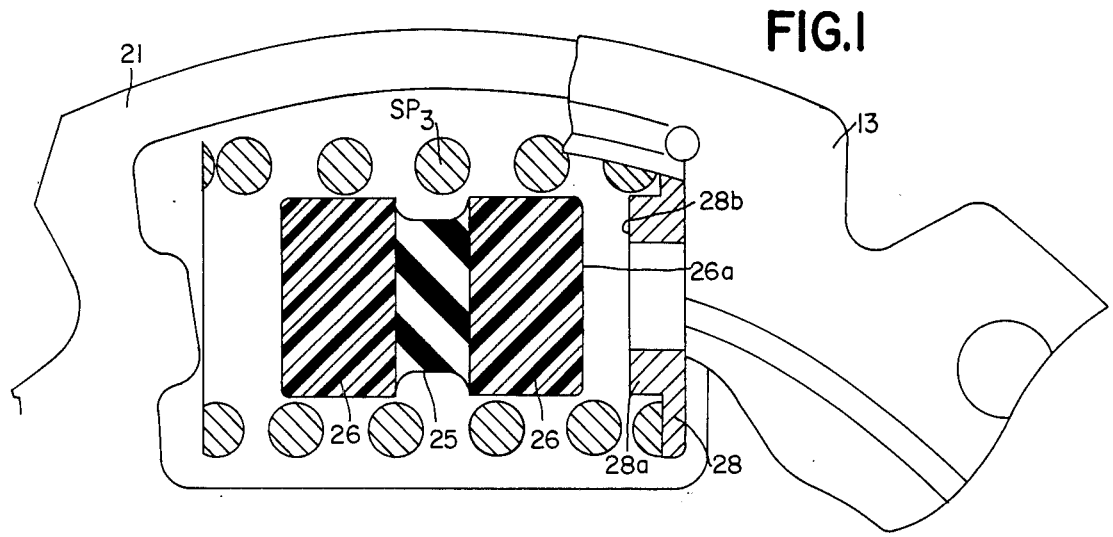
FIG. 1 is an enlarged view showing a third spring and the rubber elastic member disposed within the windows of the hub flange shown in FIG. 2.

The present invention will be described hereinbelow on the basis of an embodiment of a clutch disk 10 by way of example of the torsional vibration absorber.

A drive plate 11 is composed of a main clutch plate 12 and a subplate 13. These main and subplates 12 and 13 are fixed by pins to form an integral body, and sandwiches a hub flange 21 via friction member 14, a thrust plate 15 and a disk spring 16 provided on the side surfaces of the hub flange 21, so as to be rotatable relative to a hub 20 serving as a driven plate. A cushion plate on both the surfaces of which friction plates 18 are fixed by rivets 17, respectively is fixed to the outer circumference of the main clutch plate 12 by rivets 19. These friction plates 18 are sandwiched between a flywheel (not shown) connected to a drive source such as an output shaft of an engine (not shown) and a pressure plate (not shown) of a clutch invention.

A spline 20a fittable to a shaft (not shown) of a transmission is formed in an inner hole of the hub 20, and the flange 21 extending radially outwardly is formed integral with the hub 20 at the outer circumference thereof. As already described, the main and subplates 12 and 13 are arranged concentrically on both the sides of the flange 21, and a pin 14 for fixing these plates 12 and 13 penetrates a cutout 22 formed in the outer circumference of the flange. Therefore, the main and subplates 12 and 13 are rotatable relative to the hub 20 as long as the pin 14 is not in contact with the end surface of the cutout 22.

Figure 2:
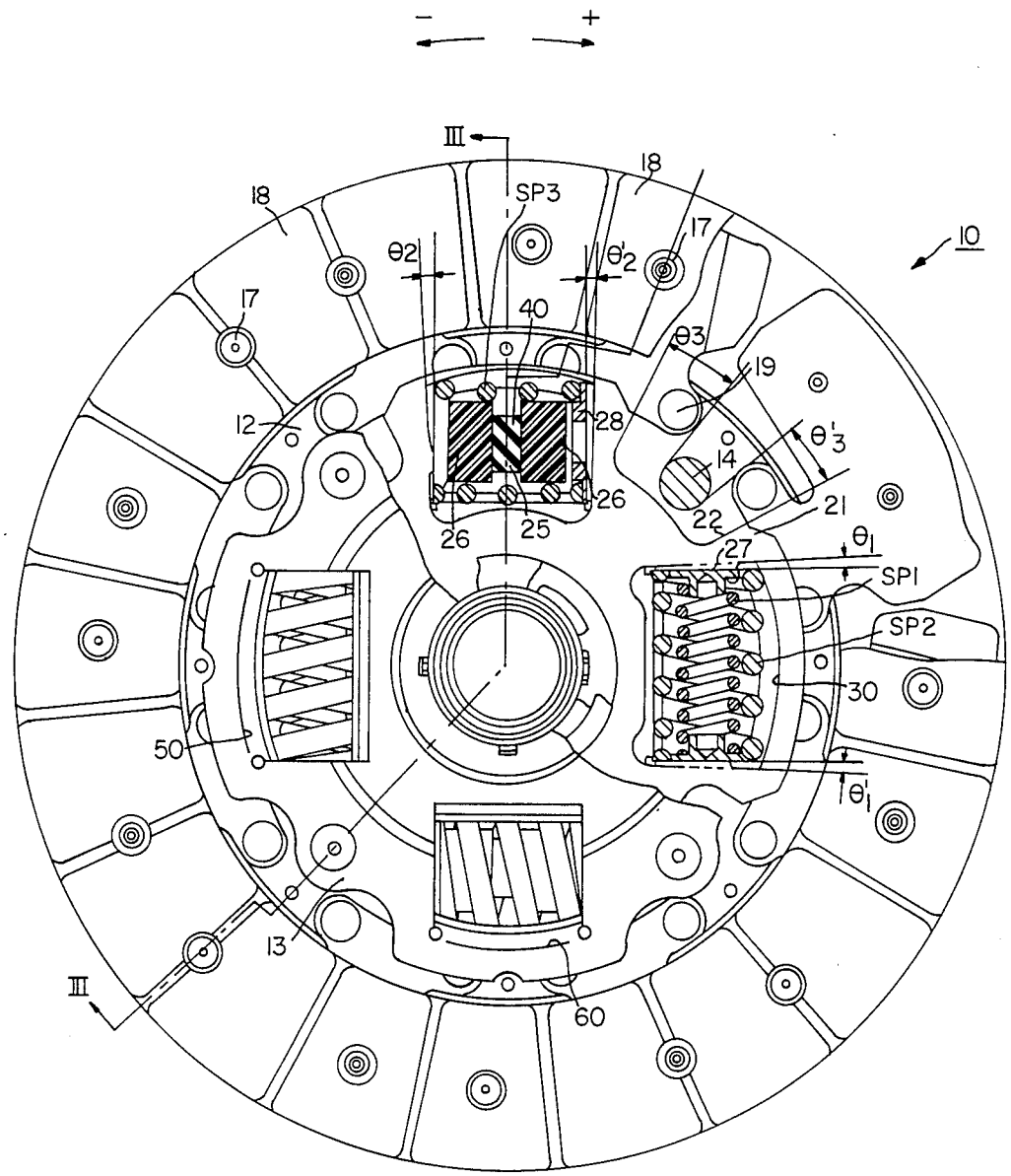
FIG. 2 is a front view, partially broken showing a clutch disk of the present invention.
Figure 3:
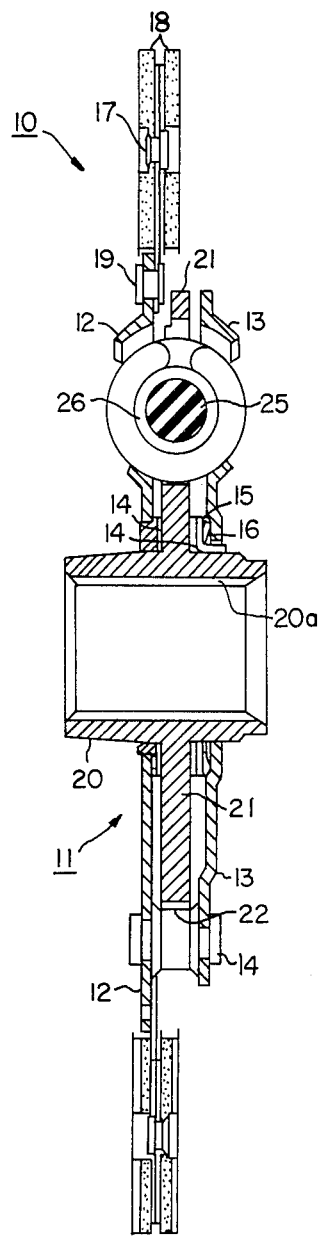
FIG. 3 is a cross-sectional view taken along the line III—III of the clutch disk shown in FIG. 2.
Figure 4:
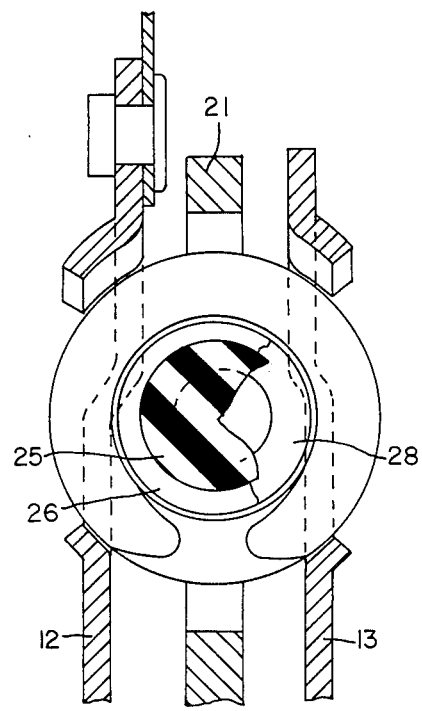
FIG. 4 is an enlarged view showing the cushion rubber elastic member and the periphery.

Four windows 30, 40, 50 and 60 of roughly rectangular shape are formed, as shown in FIG. 2, in the hub flange 21 and the main-and subplates 12 and 13 at 90° angular intervals about the axial center thereof. The windows 60 and 50 shown on the lower and left sides in FIG. 2 are formed in the main-and subplates 12 and 13, and the windows 30 and 40 shown on the upper and right sides are formed in the hub flange 21. In the right and left windows, there is disposed a double resilient members composed of a first coil spring SP1 and a second coil spring SP2, respectively; while on the upper and lower windows, there are provided a third coil spring SP3 and a cushion rubber elastic member 25, respectively. Two resin sheets 26 having a diameter larger than an external diameter of the compressed cushion rubber elastic member 25 are fixed to both ends of the elastic member 25 by strong bonding (e.g., through curing or binder) and supported so that the cushion rubber-elastic member 25 cannot be brought into contact with the inner circumference of the third coil spring SP3. A metallic seat (retainer) 28 is attached to one end of the third coil spring SP3. The metallic seat 28 comprises a cylindrical protrusion 28a and a flanged portion. The cylindrical protrusion protrudes in an inner cavity of the third coil spring SP3 for securing its aligned position with the spring SP3, while the flanged portion retains one end of the spring SP3 and with its opposite side abuts against the corresponding ends of the window 60. Note there is an angular clearance $\theta_2'$ from one end of the window 40 of the hub flange 21. The cylindrical protrusion 28a has an end surface 28b so as to receive the resin sheet 26 to abut against one end 26a thereof when the spring SP3 is compressed. Further, there are provided clearances (circumferentially and axially of the resin sheets) in such a way that the unit comprised of the cushion rubber elastic member 25 and the resin sheets 26 is freely circumferentially movable within the inner cavity of the third coil spring SP3. An angular clearance $\theta_2$ is provided between the other (left) end of the window 40 and the spring SP3. The spring SP3 is secured without angular clearance within a corresponding window 60 of the main-and subplates 12 and 13 with only one end being retained via the metallic seat 28 and the other end being directly retained by the window 60. Angular clearances $\theta_1$ and $\theta_1'$ are similarly provided between the spring SP2 and a corresponding window of the hub flange 21.

The operation of this clutch disk will be described hereinbelow. When the main-and subplates 12 and 13 rotates in the positive (forward) direction relative to the hub flange 21 (counterclockwise in FIG. 2 relative to the hub 20), only the first springs SP1 supported by the spring seats 27 in the windows 30 and 50 are compressed within an angular range of 0 to $\theta_1$. Subsequently, the second springs SP2 and the third springs SP3 are compressed together with the first springs SP1 within an angular range of $\theta_1$ to $\theta_2$. Thereafter, within an angular range of $\theta_2$ to $\theta_3$, since one side of the resin sheet 26 is brought into contact with the side end surface of the window 40 and the other end thereof is brought into contact with the side end surface of the window 60 via the metallic seat 28, the cushion rubber elastic member 25 is also compressed, and the pin 14 is brought into contact with the end surface of the flange cutout 22 at $\theta_3$.

Figure 5:
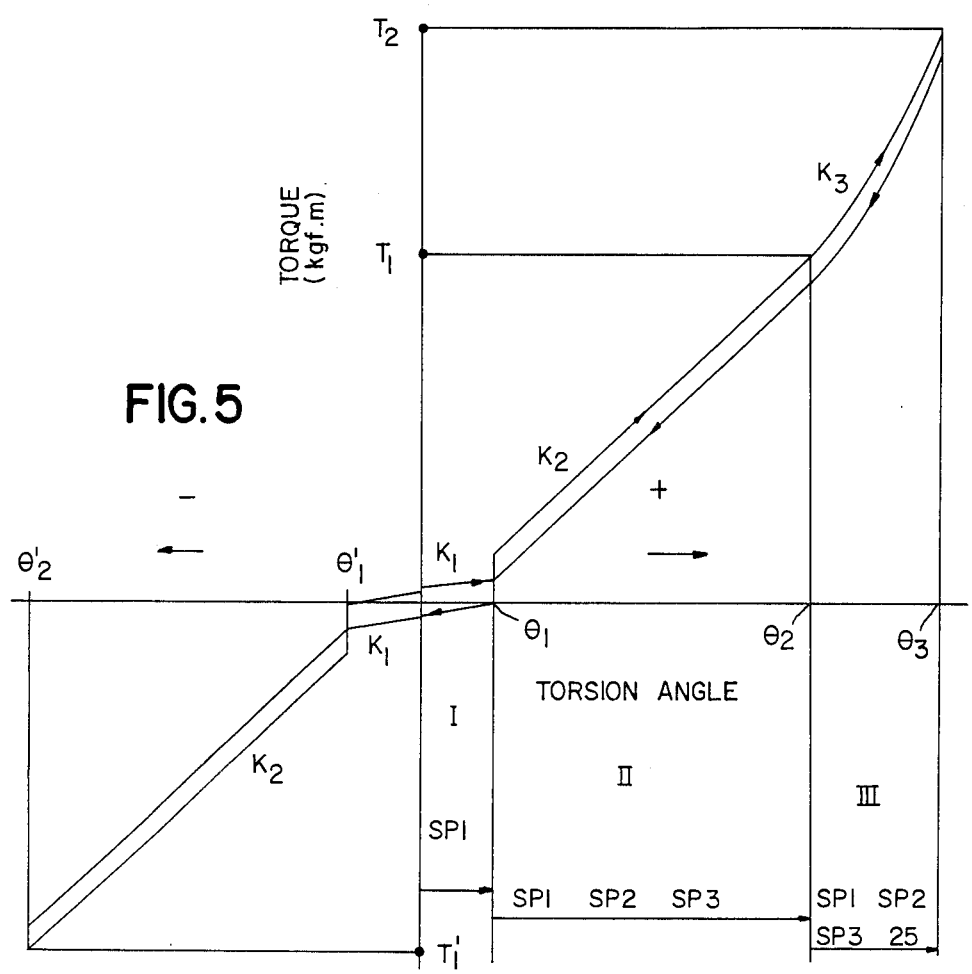
FIG. 5 shows torsional characteristics diagram obtained by the clutch disk of the present invention.

FIG. 5 shows the relationship between the relative rotational angle (e.g. torsional angle) and the torque, that is, a so-called torsional angle-torque characteristics curve under the above-mentioed operating conditions. On the positive-side, the characteristics curve is linear between 0 and $\theta_2$ where the coil springs SP1 to SP3 are compressed, but nonlinear between $\theta_2$ and $\theta_3$ where the cushion rubber elastic member 25 is additionally compressed. In the drawing, the hysteresis characteristics are due to the friction plates 14 disposed between the main-and subplates 12 and 13 and the hub flange 21, and a friction damper composed of a thrust plate 15 and a dish plate spring 16.

Further, since torque T2 at $\theta_3$ determined higher than an engine effective torque, torque will not reach T2 under the ordinary engine running conditions.

When the main-and subplates 12 and 13 rotate in the negative (reverse) direction (clockwise in FIG. 2), only the first springs SP1 are compressed within an angular range from 0 to $\theta_1'$, and the second springs SP2 and the third springs SP3 are additionally compressed within an angular range from $\theta_1'$ to $\theta_2'$. Since $\theta_2'$ is determined in such a way that the negative side (direction) torque in the ordinary running condition will not exceed the torque T1', an angular range from $\theta_2'$ to $\theta_3'$ is not present in practical use, so that it is not necessary to compress the rubber member 25 at the negative side rotation. Therefore, the metallic seat 28 is attached only on one side so as to be operative only on the positive side.

Modifications may be made within the scope of the present invention without departing from the gist and scope as disclosed and claimed hereinbelow.

I claim:

1. A torsional vibration absorber comprising:
    a drive plate connected to a drive source, a driven plate connected to a driven member, and a resilient means disposed between the two plates, the two plates being rotatable relative to each other by resiliently compressing the resilient means,
    wherein said resilient means includes a coil spring disposed along a relative rotational direction thereof and a compressive rubber elastic member loosely disposed within an inner cavity of said coil spring;
    a resin sheet at each end of the compressive rubber elastic member having a diameter larger than an external diameter of the compressive rubber elastic member and a thickness which permits smooth sliding movement axially of the coil spring while avoiding interference therewith each, said resin sheet is fixed by strong bonding to a respective end of said compressive rubber elastic member and disposed within said inner cavity of said coil spring; and
    a metallic seat disposed at one end of said coil spring so as to be brought into contact with one of said resin sheets to compress said compressive rubber elastic member only in one of the relative rotational directions along which said two plates rotate.

2. The torsional vibration absorber as defined in claim 1, wherein said resin sheets fixed to the rubber elastic member are disposed with clearance so as to allow their circumferential displacement within said inner cavity.

3. The torsional vibration absorber as defined in claim 1, wherein said one of relative rotational directions corresponds to a forward driving direction of a vehicle.

4. The torsional vibration absorber as defined in claim 1, wherein said metallic seat comprises a flanged portion for retaining one end of said coil spring and a protrusion for abutting against one of the resin sheets.

5. The torsional vibration absorber as defined in claim 1, wherein said coil spring is disposed within a window of the driven plate with a predetermined angular clearance from one side end of the window directed to a positive rotational direction.

6. The torsional vibration absorber as defined in claim 5, wherein the metallic seat is disposed within the window of the driven plate with a predetermined angular clearance between one side end of the window directed to a negative rotational direction.

7. The torsional vibration absorber as defined in claim 1, wherein said coil spring serves as at least one of a first and further range of a torsion characteristics curve representative of torque with respect to said one of the relative rotational directions.

8. The torsional vibration absorber as defined in claim 7, wherein said coil spring establishes a second range of the torsion characteristic curve.

9. The torsional vibration absorber as defined in claim 7, wherein said coil spring establishes a first range of the torsional characteristic curve of the torsional vibration absorber.

* * * * *